United States Patent
Chun et al.

(10) Patent No.: US 10,097,906 B2
(45) Date of Patent: Oct. 9, 2018

(54) SUBMARINE GAS-LEAKAGE MONITORING SYSTEM FOR LONG-TERM DETECTION OF GAS AND METHOD OF OPERATING THE SAME

(71) Applicant: Korea Institute of Geoscience and Mineral Resources, Daejeon (KR)

(72) Inventors: Jong Hwa Chun, Daejeon (KR); Young Sang Eo, Incheon (KR); Jang Jun Bahk, Daejeon (KR)

(73) Assignee: KOREA INSTITUTE OF GEOSCIENCE AND MINERAL RESOURCES, Daejeon (KR)

( * ) Notice: Subject to any disclaimer, the term of this patent is extended or adjusted under 35 U.S.C. 154(b) by 0 days.

(21) Appl. No.: 15/387,964

(22) Filed: Dec. 22, 2016

(65) Prior Publication Data

US 2017/0347169 A1    Nov. 30, 2017

(30) Foreign Application Priority Data

May 31, 2016    (KR) .................. 10-2016-0066945

(51) Int. Cl.
   *H04Q 9/00*          (2006.01)
(52) U.S. Cl.
   CPC .......... *H04Q 9/00* (2013.01); *H04Q 2209/40* (2013.01); *H04Q 2209/826* (2013.01)
(58) Field of Classification Search
   None
   See application file for complete search history.

(56) References Cited

U.S. PATENT DOCUMENTS

| | | | |
|---|---|---|---|
| 9,638,829 B2* | 5/2017 | Davoodi | G01V 11/002 |
| 2008/0144442 A1* | 6/2008 | Combee | G01V 1/22 367/131 |
| 2010/0142326 A1* | 6/2010 | Guigne | F17D 5/06 367/121 |
| 2017/0052164 A1* | 2/2017 | Ichikawa | B63B 21/20 |
| 2017/0059441 A1* | 3/2017 | Latini | G01M 3/002 |

FOREIGN PATENT DOCUMENTS

| | | | |
|---|---|---|---|
| JP | 1994-133371 | | 5/1994 |
| JP | H06133371 | * | 5/1994 |
| JP | 2016-002854 | | 1/2016 |
| JP | 2016002854 | * | 1/2016 |
| KR | 10-2011-0064355 | | 6/2011 |

* cited by examiner

*Primary Examiner* — Muhammad N Edun
*Assistant Examiner* — Jerold Murphy
(74) *Attorney, Agent, or Firm* — Dentons US LLP

(57) ABSTRACT

A submarine gas-leakage monitoring system for long-term detection of gas and a method of operating the same are disclosed. The submarine gas-leakage monitoring system includes: a buoy equipped with a satellite communication unit to transmit acquired data to a satellite or to receive a command for activation or inactivation of a first submarine sensor from the satellite when the buoy is raised to float on the seawater surface; a seabed observation unit located close to a seabed, the seabed observation unit acquiring and storing information about gas leakage from the seabed and controlling the buoy such that the buoy is raised or lowered; and a signal cable equipped with the first submarine sensor that detects migration or diffusion of leaked gas and connected between the buoy and the seabed observation unit to allow a signal transmission between the buoy and the seabed observation unit.

5 Claims, 4 Drawing Sheets

US 10,097,906 B2

SUBMARINE GAS-LEAKAGE MONITORING SYSTEM FOR LONG-TERM DETECTION OF GAS AND METHOD OF OPERATING THE SAME

CROSS-REFERENCE TO RELATED APPLICATION

This application claims priority to Korean Patent Application No. 10-2016-0066945 filed on May 31, 2016 and all the benefits accruing therefrom under 35 U.S.C. § 119, the contents of which application are incorporated by reference in their entirety.

BACKGROUND OF THE INVENTION

1. Field of the Invention

The present invention relates to a submarine gas-leakage monitoring system for long-term detection of gas and a method of operating the same. More particularly, the present invention relates to a submarine gas-leakage monitoring system for long-term detection of gas and a method of operating the same, the system and method maintaining a buoy usually in a submerged state but raising the buoy to the seawater surface so that data communication between the buoy and a satellite can be performed periodically or sporadically, for example, when it is necessary to change settings for a detection area, whereby the system and method eliminate a risk that the buoy is lost and enables change of system settings for a gas leakage detection area.

2. Description of the Related Art

There is an increasing demand for a submarine gas-leakage monitoring system to detect or monitor gas leakage due to the occurrence of natural leakage of shallow gas attributable to submarine earthquakes or the occurrence of accidental leakage of gas attributable to exploitation of conventional energy sources such as petroleum or gas, exploitation of gas hydrate, or submarine carbon dioxide capture and sequestration (CSS).

Conventionally, submarine gas-leakage monitoring systems are installed underwater to continuously collect data concerning gas leakage with the passage of time. The collected data (called time-series data) is useful to scientists who need up-to-date gas leakage information that continuously changes.

Conventional submarine monitoring systems use various detection methods that can measure comprehensive submarine information. Firstly, there is a cable-type submarine monitoring system. This system is installed on a seabed and is connected to facilities installed on land through a communication cable. This system requires high investment and operation costs because it requires high costs to connect a long cable from a seabed to land. Moreover, there is a risk that the cable is accidentally cut during fishing activities.

Secondly, there is a lander-type submarine monitoring system in which a monitoring device is usually installed underwater and periodically withdrawn to land so that data accumulated for a predetermined period of time in the monitoring device can be collected. This monitoring system is problematic in that it is difficult to verify whether data is being normally obtained before the monitoring device is withdrawn to land. When the monitoring device malfunctions and fails in collection of data, vast losses result.

Thirdly, there is a buoy-equipped submarine monitoring system that is most broadly used. In this system, a submarine monitoring device is installed on a seabed and is connected to a buoy that floats on a seawater surface through a cable. Thus, data acquired by the submarine monitoring device is transmitted to a satellite through a satellite antenna. This system has a problem that there is a high risk that the buoy is lost by being caught in fishing nets or damaged by vessels that pass by since the buoy is exposed on the seawater surface. In this case, even the whole submarine monitoring system as well as the buoy can be lost.

This system has another problem that changing of system settings can be performed only when the submarine monitoring device installed on a seabed is withdrawn to land.

An exemplary conventional art is disclosed in Korean Patent Application Publication No. 10-2011-0064355 ("System for Monitoring Environments of the Sea")

DOCUMENT OF RELATED ART

Patent Document (Patent Document 1) Korean Patent Application Publication No. 10-2011-0064355 ("System for Monitoring Environments of the Sea")

SUMMARY OF THE INVENTION

Accordingly, the present invention has been made keeping in mind the above problems occurring in the prior art, and an object of the present invention is to provide a submarine gas-leakage monitoring system for long-term detection of gas and a method of operating the same, the system and method maintaining a buoy usually in a submerged state but raising the buoy to the surface of sea water periodically or sporadically so that data communication between the buoy and a satellite can be performed, whereby the system and method eliminate a risk that the buoy is lost and can keep track of leaked gas migrating to the surface of sea water.

Accordingly, in order to accomplish the objects of the present invention, there is provided a submarine gas-leakage monitoring system for long-term detection of gas, the system including: a buoy equipped with a satellite communication unit to transmit acquired data to a satellite or to receive a command signal for activation or inactivation of a first submarine sensor from the satellite when the buoy is raised to float on the seawater surface; a seabed observation unit located close to a seabed, the seabed observation unit acquiring and storing information about gas leakage from the seabed and raising or lowering the buoy; and a signal cable that is equipped with the first submarine sensor that detects migration or diffusion of leaked gas and which is connected between the buoy and the seabed observation unit to transfer a signal between the buoy and the seabed observation unit.

The seabed observation unit may include: a frame with an internal cavity; a second submarine sensor installed in the frame and detecting gas leakage from the seabed; a data storage-and-transmission device installed in the frame and storing and transmitting data acquired by the first and second submarine sensors; a winch installed in the frame and winding or unwinding the signal cable to raise or lower the buoy; a controller installed in the frame, controlling operation of the winch to raise or lower the buoy, and controlling operation of the second submarine sensor; and a power supply device installed in the frame and supplying electric power to the first submarine sensor, the second submarine sensor, and the controller.

The controller may perform control such that the buoy is usually submerged at a predetermined depth from the seawater surface but is raised to the seawater surface to communicate with a device on a land, periodically or when a predetermined condition is satisfied.

The first submarine sensor may be present in plural and the first submarine sensors are arranged at intervals along a lengthwise direction of the signal cable to keep track of leaked gas migrating or diffusing to the seawater surface, wherein the first submarine sensors are selectively operated on the basis of a command signal for activation or inactivation of each first submarine sensor, which is transmitted from the satellite, due to limited capacity of the power supply device.

In order to accomplish the objects of the present invention, according to another aspect, there is provided a method of operating the submarine gas-leakage monitoring system for long-term detection of gas set forth, the method including the steps of: (a) storing information of leaked gas measured for a predetermined period by the second submarine sensor installed in the seabed observation unit; (b) unwinding the signal cable to raise the submerged buoy to the seawater surface periodically or when a predetermined condition is satisfied; (c) transmitting the data stored in the seabed observation unit to the buoy through the signal cable; (d) transmitting the data to a satellite through the satellite communication unit installed in the buoy; and (h) winding the signal cable to lower the buoy so that the buoy is submerged when data communication with the satellite is finished.

In the step (b), when a value detected by the second submarine sensor equals or exceeds a reference value and thus when the buoy is raised to the seawater surface, the following steps are repeatedly performed to keep track of leaked gas migrating or diffusing to the seawater surface: (e) by the controller in the seabed observation unit, receiving the command signal for activation or inactivation of each first submarine sensor provided to the signal cable, from the satellite; (f) by the controller, controlling operation of each first submarine sensor; and (g) transmitting data acquired by the first and second submarine sensors to the satellite through the satellite communication unit, wherein a distance by which the buoy is lowered in the step (h) is preset taking into account full drafts of passing vessels in an ocean area in which the buoy is installed.

Conventional buoy-equipped submarine monitoring systems have a problem that a seabed observation unit as well as a buoy is highly likely to be damaged by passing vessels since the buoy always floats on the seawater surface. In addition, since the buoy is installed on the seawater surface, it is difficult to manage the buoy and there is a risk that the buoy is stolen or lost.

In addition, conventional buoy-equipped submarine monitoring systems have a problem that it is difficult to keep track of leaked gas in emergencies because data of gas leakage can be acquired only for positions at which sensors are installed.

However, the submarine gas-leakage monitoring system for long-term detection of gas according to one embodiment of the present invention has an advantage that the buoy is unlikely to be damaged or lost because the buoy is usually submerged at a predetermined depth from the seawater surface and is sporadically raised to the seawater surface using a winch as necessary, for example, when data transmission is required.

In addition, according to the present invention, it is possible to more frequently verify whether the submarine gas-leakage monitoring system is normally operating because it is possible to collect data at a cycle of a shorter time than conventional lander-type submarine monitoring systems. In addition, when a gas leakage occurs from a seabed, operation of multiple submarine sensors can be controlled on the basis of an operation period setting signal for each submarine sensor, which is transmitted from a satellite. Therefore, it is possible to verify where leaked gas moves.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
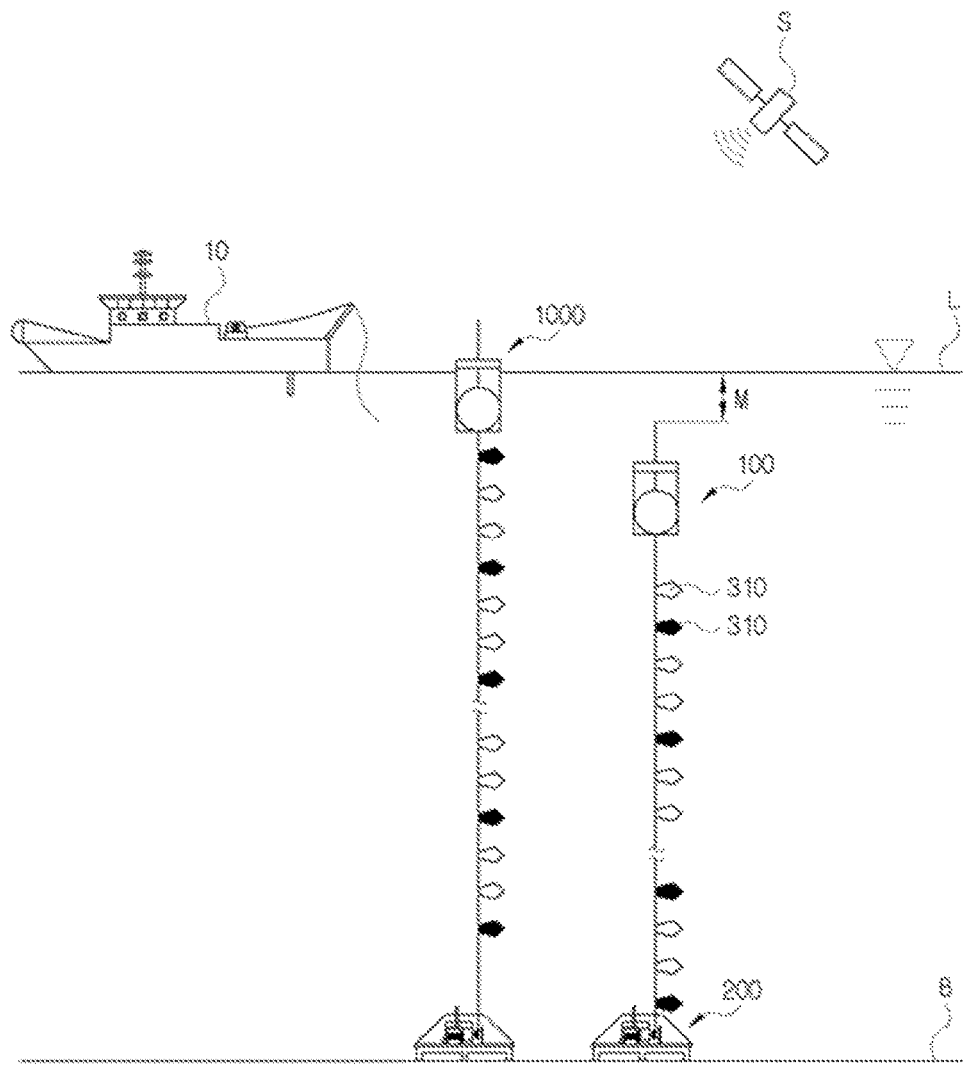
FIG. 1 is a schematic diagram illustrating a submarine gas-leakage monitoring system for long-term detection of gas according to one embodiment of the present invention.
Figure 2:
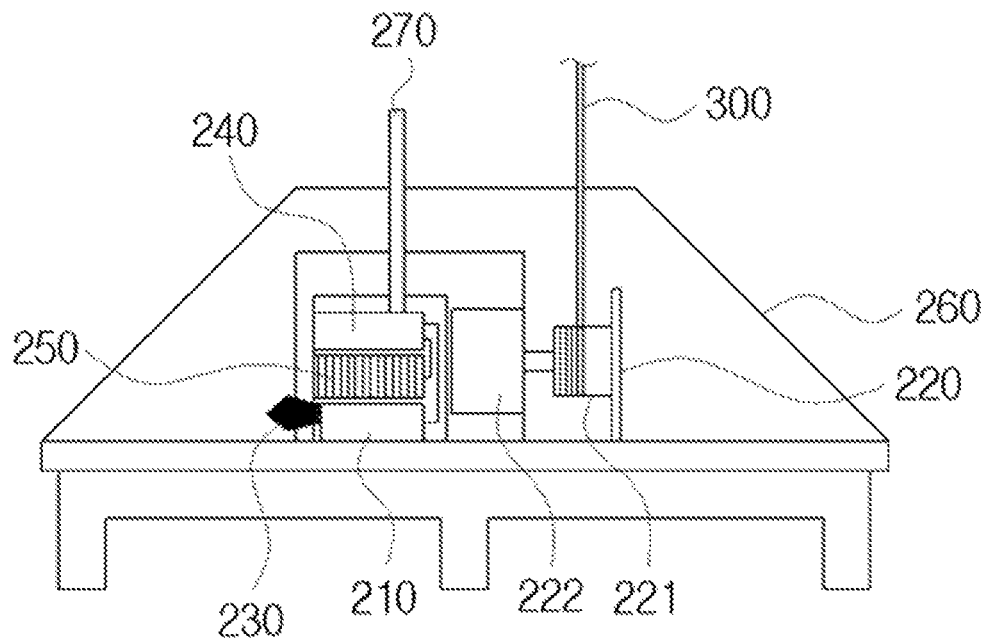
FIG. 2 is a cross-sectional view schematically illustrating a seabed observation unit according to one embodiment of the present invention.
Figure 3:
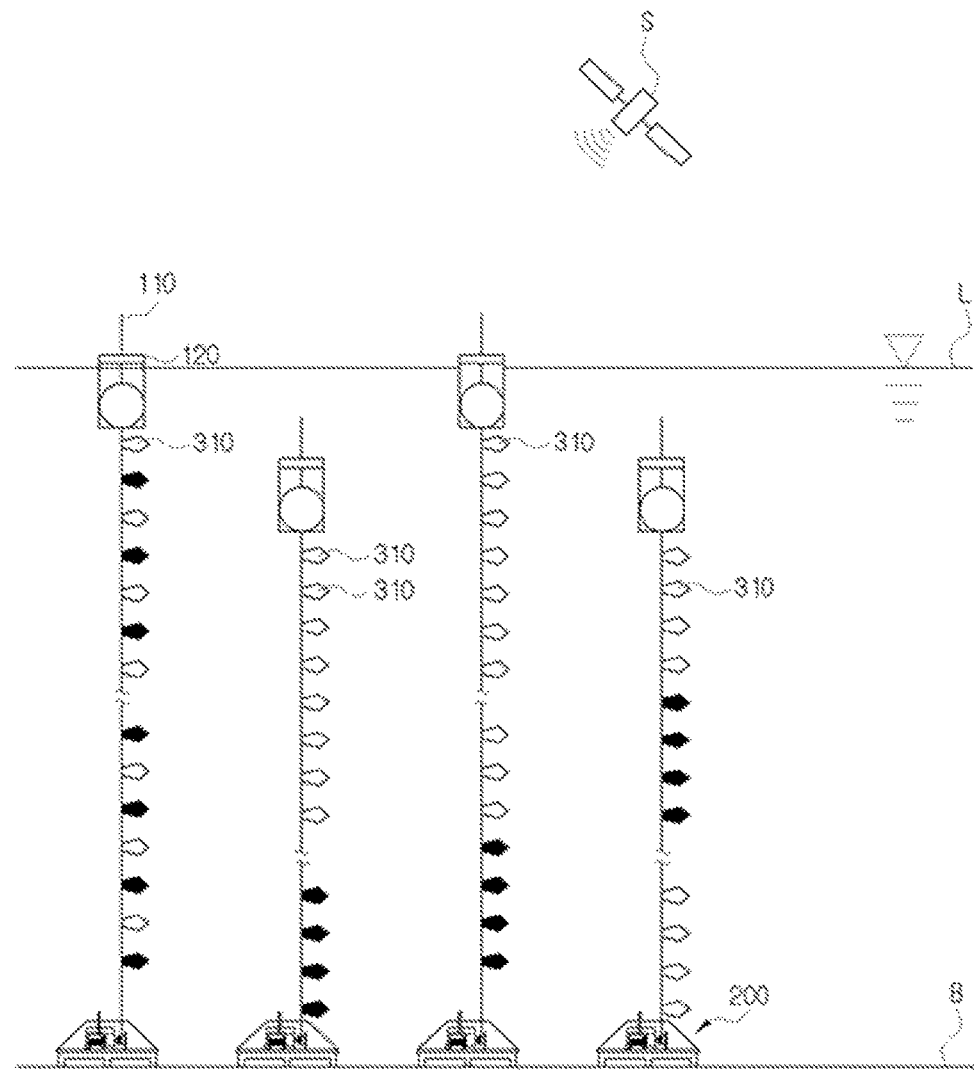
FIG. 3 is a diagram illustrating an exemplary process in which operation of first submarine sensors provided to a signal cable are controlled in the submarine gas-leakage monitoring system for long-term detection of gas according to one embodiment of the present invention.
Figure 4:
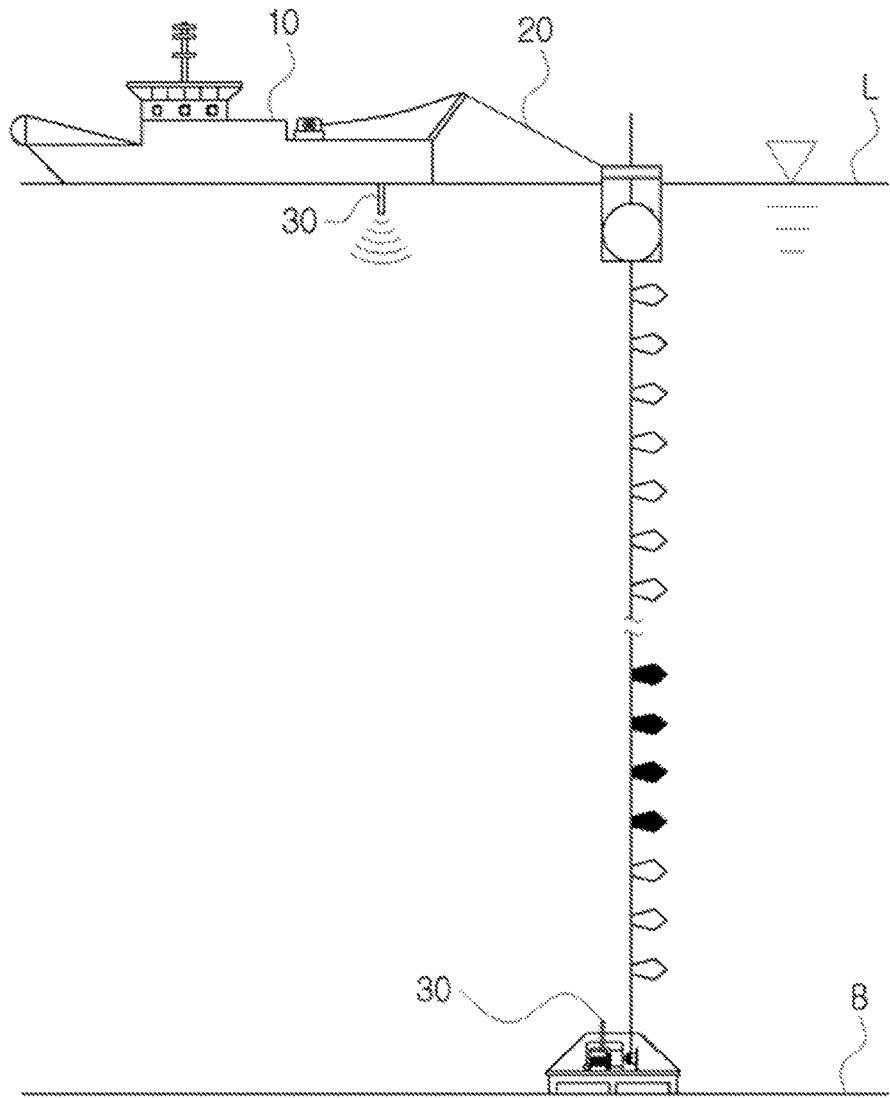
FIG. 4 is an exemplary process in which the submarine gas-leakage monitoring system for long-term detection of gas according to one embodiment of the present invention is hauled by a vessel when monitoring of underwater gas leakage is finished.

FIG. 1 is a schematic diagram illustrating a submarine gas-leakage monitoring system for long-term detection of gas according to one embodiment of the present invention; FIG. 2 is a cross-sectional view schematically illustrating a seabed observation unit according to one embodiment of the present invention; FIG. 3 is a diagram illustrating an exemplary process in which operation of first submarine sensors provided to a signal cable are controlled in the submarine gas-leakage monitoring system for long-term detection of gas according to one embodiment of the present invention; and FIG. 4 is an exemplary process in which the submarine gas-leakage monitoring system for long-term detection of gas according to one embodiment of the present invention is hauled by a vessel when monitoring of underwater gas leakage is finished.

Hereinafter, preferred embodiments of the present invention will be described below with reference to the accompanying drawings.

The accompanying drawings are provided for illustrative purposes to specifically describe the technical spirit of the present invention and therefore should not be construed as limiting the present invention.

As illustrated in FIG. 1, a submarine gas-leakage monitoring system 1000 for long-term detection of gas according to one embodiment of the present invention includes a buoy 100, a seabed observation unit 200, and a signal cable 300.

The buoy 100 is a floating body having buoyancy. An upper portion of the buoy 100 is equipped with a satellite communication unit including a satellite antenna 110 and a satellite transceiver 120. When the buoy 100 floats on seawater surface L, it can communicate with a satellite S. That is, the buoy 100 can transmit data to the satellite S and receive a command signal for activation or inactivation of each first submarine sensor from the satellite S. The buoy 100, the satellite antenna 110, and the satellite transceiver 120 are preferably installed inside a buoy frame 130 so that they can be protected from external impacts (see FIG. 3).

The seabed observation unit 200 is located close to a seabed B. The seabed observation unit 200 acquires and stores information of underwater gas leakage. The seabed observation unit 200 controls movement of the buoy 100 in a vertical direction. That is, it raises or lowers the buoy 100. The signal cable 300 connects the buoy 100 and the seabed observation unit 200 to each other and transfers a signal therethrough.

That is, the seabed observation unit 200 transmits data to the buoy 100 through the signal cable 300, and then the data is further transmitted to the satellite transceiver 120 of the buoy 100 and finally to the satellite S through the satellite antenna 110. Thereby, the data (measurement results) can be verified on land.

The signal cable 300 may be equipped with a plurality of first submarine sensors 310. The first submarine sensors 310 may be devices or sensors to monitor gas leakage. Examples of the first submarine sensors 310 include a gas sensor for sensing methane, carbon dioxide, oxygen, etc., a turbidity sensor, a temperature sensor, an ocean current sensor, and a camera.

On the other hand, as illustrated in FIG. 2, the seabed observation unit 200 according to one embodiment of the present invention may include a data storage-and-transmission device 210, a winch 220, a second submarine sensor 230, a controller 240, a power supply device 250, and a frame 260.

The frame 260 has an internal cavity to accommodate various devices therein. The bottom surface of the frame 260 is provided with a plurality of protrusions so that the frame 260 can be stably seated on a seabed. The protrusions are made of a shock-absorbing material such as rubber. Therefore, when the seabed observation unit 200 is dropped onto the seabed, various devices therein can be protected from impacts.

In addition, while the first submarine sensors 310 are provided to the signal cable 300, the second submarine sensor 230 is installed in the frame 260. Since the second submarine sensor 230 is located close to a seabed, it can monitor gas leakage from the seabed. The second submarine sensor 230 may be the same kind of device as the first submarine sensor 310.

The data storage-and-transmission device 210 is installed in the frame 260, and stores and transmits data detected by the first and second submarine sensors 310 and 230. That is, the data storage-and-transmission device 210 stores data transmitted from the first and second submarine sensors 310 and 230, and transmits the stored data to the satellite communication unit of the buoy 100 through the signal cable 300 when receiving a transmission command signal from the controller 240.

The winch 220 is installed in the frame 260. The winch 220 is a device to raise or lower the buoy 100 by winding or unwinding the signal cable 300. The winch 220 is driven by the controller 240. Specifically, the winch 220 includes a cylindrical wheel 221 around which the signal cable 300 can be wound and a motor 222 that rotates the wheel 221 at proper speed under the control of the controller 240.

That is, the buoy 100 is usually submerged at a predetermined depth from the seawater surface L and the controller 240 installed in the frame 260 unwinds the signal cable 300 periodically according to a preset period or sporadically, for example, when a predetermined condition is satisfied so that the submerged buoy 100 can be raised to the seawater surface L. When the buoy 100 is raised to the seawater surface L, the controller 240 performs control such data stored in the data storage-and-transmission device 210 in the buoy 100 is first transmitted to the satellite transceiver 120 and then to the satellite S via the satellite antenna 110.

The power supply device 250 is also installed in the frame 260. The power supply device 250 supplies electric power to the submarine sensors 230 and 310, the winch 220, and the controller 240. According to one embodiment of the present invention, since the seabed observation unit 200 and the first submarine sensors 310 are devices acquiring data in a submerged state for a long period of time, the power supply device 250 preferably may have a large capacity to supply electric power for as long time as possible.

However, even though the power supply device 250 has a large capacity, the capacity is limited. Therefore, it is preferable that the first submarine sensors 310 provided to the signal cable 300 are activated only when gas leakage occurs. This operation control will be described below.

When power remaining in the power supply device 250 is insufficient, the controller 240 raises the buoy 100 to the seawater surface L and may transmit information of the power shortage of the power supply device 250 when transmitting the data stored in the data storage-and-transmission device 210. In addition, a power line may be built in the signal cable 300 and connected to the power supply device 250. Therefore, when the buoy 100 is raised to the seawater surface, the power supply device 250 closely installed to the seabed can be charged through the power line and the buoy 100.

The gas leaking from the seabed is primarily detected by the second submarine sensor 230 installed in the seabed observation unit 200 that is located close to the seabed B. On the other hand, the first submarine sensors 310 provided to the signal cable 300 are used to measure a diffusion area of leaked gas that migrates and diffuses from the seabed to the seawater surface. For this reason, the first submarine sensors 310 are preferably arranged at regular intervals along a lengthwise direction of the signal cable 300.

In addition, data obtained by the first submarine sensors 310 provided to the signal cable 300 is transmitted to the data storage-and-transmission device 210 installed in the frame 260 through the signal cable 300, and then stored in the data storage-and-transmission device 210.

At this point, according to one embodiment of the present invention, the seabed observation unit 200 operates the winch 220 according to a preset period or a predetermined condition. That is, the seabed observation unit 200 maintains the buoy 100 in a submerged state or raises the buoy 100 to the seawater surface so that data acquired by itself can be transmitted and signals for controlling the first submarine sensors 310 can be received.

For example, when the preset period is one month, the buoy 100 is submerged under the seawater surface L for 29 days but is raised to the seawater surface L on the thirtieth day by the seabed observation unit 200 so that data accumulated for 29 days can be transmitted to the satellite S. After the transmission of data is completed, the buoy 100 is lowered to be submerged again for the following 29 days.

The buoy 100 may be raised periodically in this way. Alternatively, the buoy 100 may be raised when a predetermined condition is satisfied. For example, when a measurement value measured by the submarine sensor 230 that detects gas leakage from a seabed equals or exceeds a predetermined value (for example, 10 times a standard value), the controller 240 of the seabed observation unit 200 raises the buoy 100 to the seawater surface, and then the data stored in the data storage-and-transmission device 210 is transmitted to the satellite transceiver 120 installed in the buoy 100 through the signal cable 300 and then to the satellite S through the satellite antenna 110.

A device installed on land transmits a command signal for activation or inactivation of each first submarine sensor 310 provided to the signal cable 300 through the satellite S, on the basis of the data transmitted from the data storage-and-transmission device 210. Then, the command signal for activation or inactivation is first transmitted to the buoy 100 and then transferred to the controller 240 installed in the seabed observation unit 200 through the signal cable 300. Next, the controller 240 controls each first submarine sensor 310 on the basis of the received command signal, thereby detecting a diffusion area of leaked gas.

On the other hand, as described above, since the power supply device 250 has limited power storage capacity, the controller 240 performs control such that the first submarine sensors 310 are inactivated while the buoy 100 is submerged as usual but are activated when gas leakage is detected by the second submarine sensor 230 or when an amount of leaked gas reaches or exceeds a predetermined value. In either case, the buoy 100 is raised to the seawater surface so that data communication with the device on the land can be performed. However, the present invention may not be limited to this control. That is, the lowermost first submarine sensor 310 that is nearest the seabed and is arranged at a lower end of the signal cable 300 may be usually activated like the second submarine sensor 230.

Next, in a state in which the buoy 100 is raised to the seawater surface L, the buoy 100 transmits measurement values of the submarine sensors 230 and 310 to the device on land and continuously receives the command signal for activation or inactivation of each submarine sensor from the device on the land. For example, some first submarine sensors 310 arranged at an upper portion of the signal cable 300 are sequentially activated along with the flow of leaked gas diffusing to the seawater surface L.

FIG. 3 is a diagram illustrating an operation control example of the first submarine sensors 310. The first submarine sensors 310 that are activated are shown in black and the first submarine sensors 310 that are not activated are shown in white.

When the buoy 100 is lowered, the buoy 100 may be submerged at a predetermined depth from the seawater surface L. More preferably, a distance M between the buoy 100 and the seawater surface L is set taking into account the full drafts of passing vessels to prevent the bottom of the passing vessels from coming into contact with the buoy 100 during sailing of the vessel. The full draft means a distance from the underside of the hull of a vessel to water surface when the vessel, fully loaded to the extent allowed for safe sailing, is floating in water. The full draft varies according to the size and weight of a vessel, season, and an area in which the buoy 100 is installed. By taking into account these factors affecting the full draft, the location of the buoy 100 in water can be suitably set. For example, the buoy 100 may be located at a depth of about 50 m.

Hereinafter, a method of operating the submarine gas-leakage monitoring system 1000 will be described. The method basically includes five steps (a), (b), (c), (d), and (h).

First, in step (a), information of gas leakage measured by the second submarine sensor 230 for a predetermined period is stored in the data storage-and-transmission device 210 installed in the seabed observation unit 200. Next, in step (b), the winch 220 unwinds the signal cable 300 under control of the controller 240 when a predetermined period of time elapses or when a predetermined condition is satisfied, so that the buoy 100 located underwater is raised to the seawater surface.

Next, in step (c), data stored in the seabed observation unit 200 is transmitted to the buoy 100 through the signal cable 300. Next, in step (d), the data is transmitted to the satellite S through the satellite communication unit 110 and 120 in the buoy 100.

Finally, after the satellite communication unit 110 and 120 finishes data transmission and signal reception, step (h) is performed. That is, the signal cable 300 is unwound and thus the buoy 100 is lowered to be submerged.

On the other hand, when a value detected by the second submarine sensor 230 equals or exceeds a reference value in step (b) and when the buoy 100 is raised to the seawater surface, the following steps (e) to (g) may be further performed.

In step (e), a command signal for activation or inactivation of each first submarine sensor 310 provided to the signal cable 300 is transmitted to the controller 240 of the seabed observation unit 200 from the satellite S. In step (f), operation of each first submarine sensor is controlled by the controller 240. The number of first submarine sensors 310, activated to keep track of leaked gas that diffuses to the seawater surface, may be properly set taking into account the limited capacity of the power supply device 250. Finally, in step (g), the data detected by the submarine sensors is transmitted to the satellite S through the satellite communication unit 110 in the buoy 100.

Steps (e) to (g) are repeatedly performed a predetermined number of times until leaked gas is detected.

Conventional buoy-equipped submarine monitoring systems have a problem that since the buoy 100 always floats on the seawater surface L, the buoy 100 is likely to be damaged while a vessel sails by and there is a risk that the seabed observation unit 200 connected to the buoy 100 as well as the buoy 100 is damaged. In addition, since the buoy usually floats on the seawater surface, it is difficult to manage the buoy. That is, there is a risk that the buoy is stolen or lost.

However, according to the present invention, the buoy is usually submerged and periodically or sporadically raised to the seawater surface L as necessary. For example, the buoy is raised when it is necessary to transmit data. Therefore, there is a little risk that the buoy is stolen or lost. In addition, while conventional lander-type submarine monitoring systems have a problem that it is difficult to verify whether data is successfully acquired before the monitoring systems are withdrawn to land, the present invention has an advantage that it is possible to frequently verify whether the seabed observation unit 200 and the first submarine sensors 310 provided to the signal cable are normally operating because measured data is collected in a shorter-term cycle then the conventional lander-type submarine monitoring systems. Therefore, according to the present invention, data can be safely and more successfully obtained.

On the other hand, as illustrated in FIG. 4, to withdraw the submarine gas-leakage monitoring system 1000 according to one embodiment of the present invention to land, when the buoy 100 is raised to and exposed on the seawater surface, a vessel 10 first hauls the buoy 100 toward itself and then the signal cable 300 and the seabed observation unit 200 connected to the buoy 100.

On the other hand, as illustrated in FIGS. 2 and 4, the seabed observation unit 200 is installed in the frame 260. In addition, the seabed observation unit 200 may further include a submarine communication module 270 that enables submarine communication.

In this case, when a vessel 10 equipped with an acoustic module at a lower end thereof is approaching the submarine gas-leakage monitoring system 1000 according to one embodiment of the present invention, the controller 240 may communicate with the vessel 10 through the submarine communication module 270, and then wind or unwind the buoy 100. Alternatively, the controller 240 can receive data from the data storage-and-transmission device 210 through the signal cable 300.

The present invention is not limited to the embodiments described above and has application in broad fields. In addition, although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A submarine gas-leakage monitoring system for long-term detection of gas, the system comprising:
    a buoy equipped with a satellite communication unit to transmit acquired data to a satellite or to receive a command from the satellite for activation or inactivation of any of a plurality of first submarine sensors when the buoy is raised to float on a seawater surface;
    a seabed observation unit to acquire and store information about gas leakage from the seabed and control raising and lowering of the buoy; and
    a signal cable equipped with first submarine sensors which are to detect migration or diffusion of leaked gas, the signal cable being connected between the buoy and the seabed observation unit to allow a signal transmission between the buoy and the seabed observation unit, wherein,
        the first submarine sensors are arranged at intervals along the signal cable to track leaked gas migrating or diffusing to the seawater surface, each first submarine sensor being controllable to be activated or inactivated on the basis of the command signal received from the satellite, and
        the first submarine sensors are sequentially activated along with a flow of the leaked gas diffusing to the seawater surface.

2. The submarine gas-leakage monitoring system according to claim 1, wherein the seabed observation unit includes:
    a frame with an internal cavity;
    a second submarine sensor installed in the frame to detect gas leakage from the seabed;
    a data storage-and-transmission device installed in the frame and to store and transmit data acquired by the first and second submarine sensors;
    a winch installed in the frame to wind or unwind the signal cable to raise or lower the buoy;
    a controller installed in the frame, to control operation of the winch to raise or lower the buoy, and control operation of the second submarine sensor; and
    a power supply device installed in the frame to supply electric power to the first submarine sensors, the second submarine sensor, and the controller.

3. The submarine gas-leakage monitoring system according to claim 2, wherein the controller performs control such that the buoy is usually submerged at a predetermined depth from the seawater surface but is raised to the seawater surface when a predetermined period of time elapses or when a predetermined condition is satisfied to communicate with the satellite.

4. A method of operating a submarine gas-leakage monitoring system for long-term detection of gas, the system including:
    a buoy equipped with a satellite communication unit to transmit acquired data to a satellite or to receive a command for activation or inactivation of any of a plurality of first submarine sensors from a satellite when the buoy is raised to float on the seawater surface;
    a seabed observation unit located on a seabed and equipped with a second submarine sensor, the seabed observation unit configured to acquire information about gas leakage from the seabed and to control storage of the information about gas leakage from the seabed and to control raising or lowering of the buoy; and
    a signal cable equipped with the first submarine sensors to detect migration or diffusion of leaked gas, the signal cable being connected between the buoy and the seabed observation unit to allow a signal transmission between the buoy and the seabed observation unit,
    the method comprising the steps of:
    (a) storing, for a predetermined period of time, information about leaked gas measured by the second submarine sensor;
    (b) periodically, or when a predetermined condition is satisfied, unwinding the signal cable to raise the submerged buoy to the seawater surface;
    (c) transmitting the data stored in the seabed observation unit to the buoy through the signal cable;
    (d) transmitting the data to the satellite through the satellite communication unit installed in the buoy;
    (e) when data communication with the satellite is finished, winding the signal cable to lower the buoy so that the buoy is submerged,
    (f) when a value detected by the second submarine sensor equals or exceeds a reference value and when the buoy is raised to the seawater surface, repeatedly performing steps (f1) to (f3) to track migration or diffusion of the leaked gas to the seawater surface after performing step (d):
        (f1) by the controller in the seabed observation unit, receive from the satellite the command signal for activation or inactivation of each first submarine sensor,
        (f2) by the controller, control operation of each first submarine sensor,
        (f3) transmit data acquired by the first and second submarine sensor to the satellite via the satellite communication unit; and
    (g) when leaked gas is detected by the second submarine sensor and the buoy is raised to the seawater surface, sequentially activating the first submarine sensors.

5. The method according to claim 4, wherein a distance by which the buoy is lowered in the step (e) is preset taking into account full draft of an ocean area in which the buoy is installed.

* * * * *